United States Patent [19]

Jansen et al.

[11] Patent Number: 6,022,449
[45] Date of Patent: Feb. 8, 2000

[54] PAPER FINISHING PROCESS USING POLYISOCYANATES WITH ANIONIC GROUPS AND CATIONIC COMPOUNDS

[75] Inventors: Bernhard Jansen, Köln; Joachim König, Odenthal; Peter Nowak, Dormagen, all of Germany

[73] Assignee: Bayer Aktiengesellschaft, Leverkusen, Germany

[21] Appl. No.: 08/973,066

[22] PCT Filed: May 20, 1996

[86] PCT No.: PCT/EP96/02168

§ 371 Date: Nov. 25, 1997

§ 102(e) Date: Nov. 25, 1997

[87] PCT Pub. No.: WO96/38629

PCT Pub. Date: Dec. 5, 1996

[30] Foreign Application Priority Data

Jun. 1, 1995 [DE] Germany ............ 195 20 092

[51] Int. Cl.⁷ .......... D21H 17/08; D21H 21/20; D21H 23/50

[52] U.S. Cl. .......... 162/135; 162/164.6; 162/158; 162/168.2

[58] Field of Search .............. 162/135, 158, 162/164.6, 168.1, 181.6, 181.8, 183; 427/391, 395; 428/423.1, 425.1

[56] References Cited

U.S. PATENT DOCUMENTS

| | | |
|---|---|---|
| 2,970,140 | 1/1961 | Hullinger et al. ............ 260/233.3 |
| 3,640,840 | 2/1972 | Zieman et al. ............ 162/164 |
| 3,649,616 | 3/1972 | Goldstein et al. ........... 260/233.3 R |
| 4,250,299 | 2/1981 | Lehmann et al. ............ 528/342 |
| 4,742,134 | 5/1988 | Butler et al. ............ 526/238 |
| 5,292,404 | 3/1994 | Hartan et al. ............ 162/164.6 |
| 5,389,203 | 2/1995 | Sawayama et al. ............ 162/135 |
| 5,397,436 | 3/1995 | Robeson et al. ............ 162/158 |
| 5,428,112 | 6/1995 | Ahlers et al. ............ 525/326.7 |
| 5,430,110 | 7/1995 | Ahlers et al. ............ 525/328.2 |
| 5,434,222 | 7/1995 | Reiners et al. ............ 525/432 |
| 5,503,714 | 4/1996 | Reiners et al. ............ 162/164.6 |
| 5,536,370 | 7/1996 | Scherr et al. ............ 162/164.3 |
| 5,630,907 | 5/1997 | Nilz et al. ............ 162/168.2 |

FOREIGN PATENT DOCUMENTS

| | | |
|---|---|---|
| 0431423 | 6/1991 | European Pat. Off. . |
| 3721057 | 1/1989 | Germany . |
| 04211480 | 10/1993 | Germany . |
| 1462597 | 1/1977 | United Kingdom . |

OTHER PUBLICATIONS

Abstract pf JP 55090699A (Derwent Acc No. 1980–59599C), Dec. 1978.

Abstract of DE 3600595A (Derwent Acc No. 1987–199499), Jan. 1986.

Abstract of BE 836210A (Derwent Acc No. 1976–33978X), Dec. 1974.

V.W. Siefken, Mono– und Polyisocyanate IV. Mitteilung über Polyurethane★, Justus Liebigs Annalen der Chemie, 562. Band, pp. 6–136, (Dec. 11, 1948).

*Primary Examiner*—Dean T. Nguyen
*Attorney, Agent, or Firm*—Joseph C. Gil; Richard E. L. Henderson

[57] ABSTRACT

The use of water-dispersible polyisocyanates with anionic and/or potentially anionic groups and cationic and/or potentially cationic compounds in paper finishing leads not only to higher retention but also to improved dry and wet strength and sizing.

6 Claims, No Drawings

PAPER FINISHING PROCESS USING POLYISOCYANATES WITH ANIONIC GROUPS AND CATIONIC COMPOUNDS

BACKGROUND OF THE INVENTION

The invention relates to a process for the production of finished paper having a greatly improved wet and dry strength, sizing and intrinsic retention using a) polyisocyanates having anionic or potentially anionic groups and b) polymers having cationic or potentially cationic groups.

EP-A 582 166 relates to water-dispersible polyisocyanates having tertiary amino groups and/or ammonium groups, i.e. having cationic or latently cationic groups, and optionally having polyether groups, and to a process for the production of cellulose-containing material, which has been given a dry strength and wet strength treatment and/or sized, using these water-dispersible polyisocyanates. The co-use of cationic auxiliaries, such as, for example, retention agents, is referred to, retention agents which are mentioned being customary cationic retention agents and so-called dual systems comprising cationic or cationic or anionic and, if appropriate, individual components, such as silica sols. Additional retention agents are not co-used in the examples of EP-A 582 166. The reader thus gains the impression that retention agents should at the most be used together with cationic polyisocyanates if they comprise at least partly, but preferably entirely, cationic products, but a reason for this is not given; the advantages or disadvantages are not discussed.

German Offenlegungsschrift 4 211 480 relates to a process for increasing the wet strength of paper using water-dispersible polyisocyanates. If appropriate, the products can also be employed with customary cationic fixing agents and retention agents, preferably together with agents for increasing the wet strength. Retention agents which are mentioned in this context are cationic polycondensates of polyamines, preferably N-methyl-bis-(3-aminopropyl)-amine, and alkylene dihalides, preferably dichloroethane. The effects of this joint use of water-dispersible polyisocyanate and cationic retention agent are described in Example 4 of German Offenlegungsschrift 4 211 480. The data of Example 4 show that the joint addition 1. of a polyisocyanate containing polyethylene oxide groups and 2. of a cationic retention agent indeed leads to a marked (desired) increase in the ash content, but also leads to an (undesirable) reduction in the wet strength. Although according to German Offenlegungsschrift 4 211 480 polyisocyanates containing carboxyl groups are mentioned as preferred water-dispersible polyisocyanates which can easily be dispersed in water after at least partial neutralization of the carboxyl groups, only non-ionic water-dispersible polyisocyanates (containing polyether groups) are employed in the examples.

Surprisingly, it has now been found that not only the retention, which is reflected in the ash content (in the case of paper grades containing filler), but also the dry and wet strength and the sizing can be improved if water-dispersible polyisocyanates having anionic (or potentially anionic) groups and, as retention agents, cationic (or potentially cationic) compounds are employed.

SUMMARY OF THE INVENTION

The invention thus relates to a process for finishing paper, in which

A) a polyisocyanate having an NCO content of 1 to 21.5, preferably 4 to 20%, by weight, and 50 to 5,000, preferably 50 to 3,500, milliequivalents of anionic and/or potentially anionic groups per 100 g of polyisocyanate A and B) a compound having 5 to 5,000, preferably 50 to 3,500, milliequivalents of cationic and/or potentially cationic groups per 100 g of compound B are metered into the pulp, i.e. the aqueous cellulose-containing fibre raw material suspension (use in the pulp), or compound B is metered into the pulp and polyisocyanate A is metered onto the surface of the cellulose-containing base paper (use on the surface)

in amounts such that the weight ratio of fibre raw material:A:B is 100:(0.001 to 25, preferably 0.1 to 10):(0.001 to 25, preferably 0.01 to 10)—in each case based on the solid (dry).

DESCRIPTION OF THE PREFERRED EMBODIMENTS

Preferred polyisocyanates A have a molecular weight, determined as the number-average, of 300 to 25,000, preferably 400 to 5,000.

Polyisocyanates A can be obtained by reaction of a) organic polyisocyanates having an average NCO functionality of 1.8 to 4.2, b) NCO-reactive compounds comprising (potentially) anionic groups and, if appropriate, c) polyalkylene oxide alcohols, amines and/or thiols.

Possible organic polyisocyanates a) are aliphatic, cycloaliphatic, araliphatic, aromatic or heterocyclic polyisocyanates, such as are described, for example, by W. Siefken in Liebigs Annalen der Chemie 562, pages 75–136.

Preferred polyisocyanates a) are compounds of the formula $Q(NCO)_n$ having an average molecular weight of less than 1500, wherein n denotes a number from 2 to 4 and Q denotes an aliphatic $C_4$–$C_{12}$-hydrocarbon radical, a cycloaliphatic $C_6$–$C_{15}$-hydrocarbon radical, an araliphatic $C_7$–$C_{15}$-hydrocarbon radical or a heterocyclic $C_2$–$C_{12}$-radical having 1 to 3 heteroatoms from the series consisting of oxygen, sulphur and nitrogen, for example (i) diisocyanates, such as ethylene diisocyanate, tetramethylene 1,4-diisocyanate, hexamethylene 1,6-diisocyanate, dodecane 1,12-diisocyanate, cyclobutane 1,3-diisocyanate, cyclohexane 1,3- and 1,4-diisocyanate and any desired mixtures of these isomers, 1-isocyanato-2-isocyanatomethyl-cyclopentane, 1-isocyanato-3,3,5-trimethyl-5-isocyanatomethyl-cyclohexane, and hexahydrotolylene 2,4- and 2,6-diisocyanate and any desired mixtures of these isomers, hexahydrophenylene 1,3-and/or 1,4-diisocyanate, perhydro-diphenylmethane 2,4'- and/or 4,4'-disocyanate, phenylene 1,3- and 1,4-diisocyanate, tolylene 2,4- and 2,6-diisocyanate and any desired mixtures of these isomers, diphenylmethane 2,4'- and/or 4,4'-diisocyanate and naphthalene 1,5-diisocyanate, polyisocyanates containing uretdione groups, such as, for example, bis-(6-isocyanatohexyl)-uretdione or the dimer of 1-isocyanato-3,3,5-trimethyl-5-isocyanatomethylcyclohexane containing the uretdione structure and any desired mixtures of the abovementioned polyisocyanates; (ii) polyisocyanates which are trifunctional or more than trifunctional, such as the isomers of the triisocyanatotriphenyl thiophosphate series and their mixtures; the isomers of the triisocyanatotriphenylmethane series (such as triphenylmethane-4,4',4"-triisocyanate) and their mixtures; and polyphenol-polymethylene polyisocyanates such as are obtained by aniline/formaldehyde condensation and subsequent phosgenation; and (iii) compounds which are prepared from the polyisocyanates (i) and/or (ii) by allophanation, trimerization, biuretation or urethanation and contain at least 3 isocyanate groups per molecule. Examples of polyisocyanates prepared by trimerization are the trimer of 1-isocyanato-3,3,5-trimethyl-5-isocyanatomethylcyclohexane obtainable by isocyanurate formation and the polyisocyanates which are obtainable by trimerization of hexamethylene diisocyanate, if appropriate mixed with 2,4-diisocyanatotoluene, and contain isocyanurate groups. Examples of polyisocyanates prepared by biuretation are tris-(isocyanato-hexyl)-biuret and mixtures thereof and its higher homologues, such as are accessible, for example, in accordance with German Offenlegungsschrift 23 08 015. Examples of polyisocyanates prepared by urethanation are the reaction products of diisocyanates (i) with at least 3-hydric, preferably 3- or 4-hydric low molecular weight polyols in a ratio such that when all the NCO-reactive hydroxyl groups of the polyols are reacted, the product obtained contains on average at least 2.5, preferably at least 3 free isocyanate groups per molecule. Such products include, for example, the reaction products of 1-isocyanato-3,3,5-trimethyl-5-isocyanatomethyl-cyclohexane and of hexamethylene diisocyanate and tolylene diisocyanate (including isomer mixtures thereof) as well as diisocyanatodiphenylmethane (including isomer mixtures thereof) with substoichiometric amounts of $C_3$–$C_{10}$-polyols having 3 or 4 hydroxyl groups, such as trimethylolethane or -propane or pentaerythritol. These polyols may, for example, also contain ester structures and/or acid amide structures. These polyisocyanates (iii) containing urethane groups can be prepared by reaction of the low molecular weight polyol with a large excess of diisocyanate (i) and subsequent removal of the excess diisocyanate by distillation. Instead of the polyisocyanates (iii) of higher functionality containing urethane groups, it is also possible to employ compounds in which all or some of the urethane groups are replaced by urea groups; such compounds can be obtained by co-using low molecular weight polyamines in the reaction with the diisocyanates (i).

Compounds which can be employed in general as structural components (b) for the introduction of ionic groups are those which also contain, per molecule, at least one anionic group (such as, for example, a carboxylate, sulphonate, phosphate, phosphonate or phosphinate group) in addition to at least one NCO-reactive group. Suitable structural components (b) for the introduction of potentially anionic groups are compounds which contain, per molecule, at least one group capable of forming an anionic group, in addition to at least one NCO-reactive group. Such potentially anionic groups are, for example, carboxyl, sulpho, phosphonic acid, phosphoric acid and phosphinic acid groups.

Preferred components (b) are thus, above all, compounds which contain carboxyl or sulpho groups capable of salt formation:

1) hydroxy- and mercapto-carboxylic acids, such as glycolic acid, thioglycolic acid, lactic acid, trichlorolactic acid, dimethylolpropionic acid, maleic acid, dihydroxymaleic acid, dihydroxyfumaric acid, tartaric acid, dihydroxytartaric acid, mucic acid, saccharic acid, citric acid, salicylic acid, 2,6-dihydroxybenzoic acid, protocatechuic acid, α-resorcylic acid, β-resorcylic acid, hydroquinone-2,5-dicarboxylic acid, 4-hydroxyisophthalic acid, 4,6-dihydroxyisophthalic acid, hydroxyterephthalic acid, 5,6,7,8-tetrahydro-2-naphthol-3-carboxylic acid, 1-hydroxy-2-naphthoic acid, 2,8-dihydroxy-3-naphthoic acid, β-hydroxypropionic acid, 2,2-dimethyl-3-hydroxypropionic acid and m-hydroxybenzoic acid, 2) aminocarboxylic acids, such as oxaluric acid, anilido acetic acid, 2-hydroxycarbazole-3-carboxylic acid, glycine, sarcosine, methionine, α-alanine, β-alanine, 6-aninocaproic acid, 6benzylaroin-2-chlorocapoic acid, 4-aminobutyric acid, aspartic acid, glutamic acid, histidine, anthranilic acid, 2-ethylaminobenzoic acid, N-2-carboxyphenyl)-aminoacetic acid, 2-3'-amninobenzenesulphonyl-amnino)-benzoic acid, 3-arninobenzoic acid, 4-aninobenzoic acid, N-phenylaminoacetic acid, 3,4-diaminobenzoic acid, 5-aminobenzenedicarboxylic acid and 5-(4'-aminobenzoyl-amino)-2-aminobenzoic acid, 3) hydroxysulphonic acids, such as 2-hydroxyethanesulphonic acid, phenol-2-sulphonic acid, phenol-3-sulphonic acid, phenol4-sulphonic acid, phenol-2,4-disulphonic acid, 2-hydroxy-1-benzoic acid-5-sulphonic acid, 1-naphthol sulphonic acid, 1-naphtholdisulphonic acid, 8-chloro-1-naphtholdisulphonic acid, 1-naphtholtrisulphonic acid, 2-naphthol-1-sulphonic acid, 2-naphtholtrisulphonic acid, 1,7-dihydroxynaphthalene-3-sulphonicacid, 1,8-dihydroxynaphthalene-2,4-disulphonic acid, chromotropic acid, 2-hydroxy-3-naphthoic acid-6-sulphonic acid and 2-hydroxycarbazole-7-sulphonic acid, and 4) aminosulphonic acids, such as amidosulphonic acid, hydroxyaminemonosulphonic acid, hydrazinedisulphonic acid, sulphanilic acid, N-phenylaminomethanesulphonic acid, 4,6-dichloroaniline-2-sulphonic acid, phenylene-1,3-diamine-4,6disulphonic acid, N-acetyl-1-naphthylamine-3-sulphonic acid, 1-naphthylaminesulphonic acid, 2-naphthylaminesulphonic acid, naphthylaminedisulphonic acid, naphthylaminetrisulphonicacid,4,4'-di-(p-aminobenzoylarnino)-diphenylurea-3,3'-disulphonic acid, phenylhydrazine-2,5-disulphonic acid, 2,3-dimethyl4-aminoazobenzene-4',5-disulphonic acid, 4'-aminostilbene-2,2'-disulphonic acid-<4-azo-4>-anisole, carbazole-2,7-disulphonic acid, taurine, methyltaurine, butyltaurine, 3-amino-1-benzoic acid-5-sulphonic acid, 3-aminotoluene-N-methanesulphonic acid, 6-nitro-1,3dimethylbenzene-4-sulphamic acid, 4,6-diaminobenzene-1,3-disulphonic acid, 2,4-diaminotoluene-5-sulphonic acid, 4,4'-diaminodiphenyl-2,2'-disulphonic acid, 2-aminophenolfsulphonic acid, 4,4'-diaminodiphenyl ether-2-sulphonic acid, 2-amino-anisole-N-methanesulphonic acid and 2-amino-diphenylaminesulphonic acid.

Suitable salt-forming agents are inorganic and organic bases, for example sodium hydroxide, potassium hydroxide, potassium carbonate, sodium bicarbonate, ammonia and primary, secondary and tertiary amines.

Finally, organic phosphorus compounds can also be used as compounds which are capable of salt formation, such as, for example, bis-(α-hydroxyisopropyl)-phosphinic acid, hydroxyalkanephosphonic acid and phosphoric acid bis-glycol ester.

The reaction of the reaction participants can be carried out with or also without a solvent.

Preferred components (b) are thus polyhydroxycarboxylic and -sulphonic acids, polyaminocarboxylic and -sulphonic acids and the salts of these compounds (above all alkali metal and ammonium salts, in particular the sodium and potassium salts). They can correspond to the formula

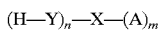

wherein

Y represents O and/or NH,

X represents $C_1$–$C_{15}$-alkylene, $C_5$–$C_{15}$-cycloalkylene or a radical of the formula

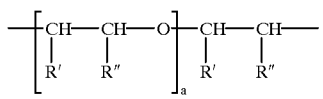

wherein R' and R" independently of one another denote hydrogen or methyl, with the proviso that at least one of the radicals is hydrogen, and a denotes a number from 0 to 15, A represents —COOH, —$SO_3H$, —$COO^-Me^+$ or —$SO_3^-$ $Me^+$, where Me is a metal cation or ammonium cation which, in the case of polyvalent metals, represents 1 equivalent of such a metal ion, and n and m denote integers from 1 to 5.

It is of course also possible to use sulphonate- or carboxylate-diols as components (b); suitable compounds of this class are described, for example, in German Offenlegungsschrift 24 46 440. They correspond in general to the formulae

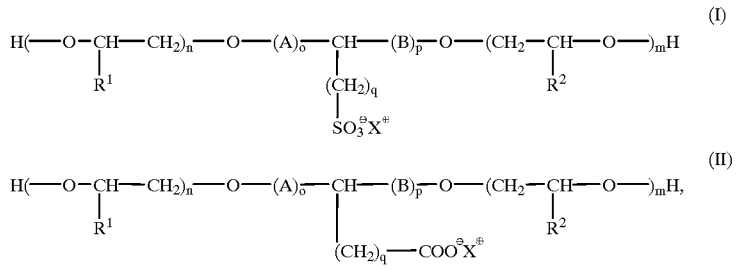

wherein

A and B represent identical or different divalent aliphatic hydrocarbon radicals having 1 to 6 carbon atoms, $R^1$ and $R^2$ independently of one another represent hydrogen, an aliphatic hydrocarbon radical having 1 to 4 carbon atoms or a phenyl radical, $X^{\oplus}$ represents an alkali metal cation or an optionally substituted ammonium group, n and m independently of one another represent zero or numbers from 1 to 30, o and p represent in each case zero or 1 and q represents zero, 1 or 2.

Preferred cations $X^{\oplus}$ include potassium, sodium and ammonium ions, wherein the ammonium nitrogen can be substituted by up to 4 organic $C_1$–$C_{10}$ radicals, and wherein, instead of two such substituents, a divalent 4- or 5-membered radical which optionally contains heteroatoms (such as oxygen, nitrogen or sulphur) and, together with the nitrogen atom belonging to $X^{\oplus}$, forms a heterocyclic ring, for example a morpholine or hexahydropyridine ring, can also occur.

Preferred components (c) include mono- and polyfunctional, in particular monofunctional polyether alcohols. Suitable components (c) thus include, above all, poly-$C_2$–$C_6$-, preferably —$C_2$–$C_3$-alkylene ethers, started from monohydric alcohols. Instead of hydroxyl end groups, the polyalkylene ethers (c) can also carry amino or mercapto end groups.

The polyisocyanates A preferably have a content of incorporated polyalkylene ether groups, calculated as recurring alkylenoxy groups [O-alkylene-]$_x$, of 3 to 25% by weight, based on polyisocyanate A. The polyalkylene ether groups preferably contain ethylene oxide units to the extent of 50 to 100% by weight, and in addition to these preferably exclusively propylene oxide units. Ethylene oxide polyethers and ethylene oxide/propylene oxide copolyethers having a predominant weight content of ethylene oxide units are thus accordingly preferred. Pure ethylene oxide polyethers are preferred. The incorporated polyethylene oxide blocks can have an average molecular weight of 220 to 6,000, preferably 500 to 3,000.

The polyisocyanates A can be prepared by reacting the polyisocyanates (a) with components (b) and, if appropriate, (c) simultaneously or in any desired sequence. A preferred reaction temperature is 50 to 120° C.; the reaction is in general concluded within 1 to 3 hours.

Although it is often of particular advantage to dispense with organic solvents entirely, organic solvents can of course also be employed for the preparation of the polyisocyanates A. In the case of highly viscous polyisocyanates A, the co-use of organic solvents is regularly appropriate.

Preferred organic solvents include, inter alia, ketones, such as acetone, methylethylketone and cyclohexanone, ethers, such as diethyl ether and dibutyl ether, tetrahydrofuran and dioxane, ethers and/or esters of ethylene glycol and propylene glycol, such as ethylene glycol monomethyl and monoethyl ether, ethylene glycol monomethyl and monoethyl ether-acetate, $C_2$–$C_4$-carboxylic acid $C_1$–$C_6$-alkyl esters, such as ethyl and butyl acetate, amides, such as N,N-dimethylformamide, N,N-dimethylacetamide and N-methylpyrrolidone, sulpholane, N-methyl-caprolactam, propylene glycol diacetate, benzine and aromatics, such as benzene, toluene and xylenes. The use of organic solvents which contain NCO-reactive groups, such as, for example, methanol, ethanol or n- or isopropanol, in the course of the preparation of the polyisocyanates A is not recommended. If desired, the organic solvents can be removed again from the polyisocyanates A, for example by distillation.

The polyisocyanates A are outstandingly suitable for the preparation of aqueous dispersions. They are also preferably used in this form. The content of polyisocyanates A in these aqueous dispersions can vary within wide limits and is as a rule 20 to 80, preferably 25 to 50% by weight. The polyisocyanates A can be dispersed by adding the polyisocyanate A to water. The two components are expediently combined with stirring. The dispersing operation can be carried out in the absence or in the presence of organic, preferably water-miscible solvents.

The use of organic solvents during the dispersing operation can usually be dispensed with because the polyisocyanates A in general usually form dispersions spontaneously with water.

The temperature during the dispersing operation can in general be 20 to 100, preferably 30 to 80° C. The resulting aqueous dispersions in general comprise the polyisocyanates A as particles having an average diameter $d_{50}$ of 50 to 500, preferably 100 to 300 μm.

The average particle diameter $d_{50}$ is the diameter above and below which in each case 50% by weight of the particles lie. It can be determined by means of ultracentrifuge measurements (W. Scholtan, H. Lange, Kolloid. Z. and Z. Polymere 250 (1972), 782–796) or by means of electron microscopy and subsequent counting of particles (G. Kampf, H. Schuster, Angew. Makromolekulare Chemie 14 (1970), 111–129).

Suitable compounds B having cationic or potentially cationic groups are all compounds having primary, secondary and tertiary amino groups and ammonium groups obtainable therefrom by protonation or alkylation, in the amounts according to the claims. Preferred (potentially) cationic groups are, above all, the groups —NR'''$_2$, —N$^\oplus$R$_3$ and —N$^\oplus$HR'''$_2$, wherein R''' represents hydrogen or $C_1$–$C_{10}$-alkyl. Preferred compounds B contain 2 to 3, preferably 2 to 12 C atoms per abovementioned amino or a ammonium group. Preferred compounds B have molecular weights, determined as the number-average, of 500 to $10^8$, preferably 500 to $10^7$. Preferred compounds B include those (potentially) cationic compounds such as are recommended as retention agents[1,2,3]. All the molecular weights mentioned below are likewise determined as the number-average, unless stated otherwise.

[1] D. Eklund and T. Lindström, Paper Chemistry, DT Paper Science Publications, Grankulla 1991

[2] J. C. Roberts (Ed.), Paper Chemistry, Blackie & Sons Ltd., Glasgow, London 1991

[3] G. Tegge, Stärke und Stärkederivate [Starch and starch derivatives], Behr's Verlag, Hamburg, 2nd Edition 1988, pages 188 to 189

The compounds B include, for example, cationic starch, such as is obtainable, for example, by the action of aminoalkyl halides or epoxides on starch in an alkaline medium, that is to say, for example, on an alkaline starch suspension, at elevated temperature (for example 100° C.); cf. "Methoden der Organisehen Chemie" [Methods of Organic Chemistry] (Houben-Weyl), Volume XIV/2, Georg Thieme Veroag, Stuttgart 1963, page 913 and literature cited there.

Preferred potentially cationic groups of this type are the N,N-diethylaminoethyl and -propyl ether groups. Tertiary amines which contain a β-halogenated alkyl, a 2,3-epoxypropyl or a 3-chloro-2-hydroxypropyl radical are preferably suitable for the introduction of tertiary amine groups U.S. Pat. No. 2,970,140). The reagent used most frequently for the introduction of tertiary amino groups is N,N-diethylaminoethyl chloride hydrochloride. Epoxy compounds, such as 2,3-epoxypropyl-trimethylammonium chloride, are suitable for the introduction of quaternary ammonium groups (U.S. Pat. No. 3,649,616). The cationic starches in general have a nitrogen content of 0.1% to 0.4% by weight.

The cationic starches also include the starch derivatives obtainable from dialdehyde starch by treatment with betaine hydrazide hydrochloride; cf. literature footnote 2, pages 90 to 92.

The compounds B furthermore include, for example, polydialkyldimethylammonium chloride (poly-DADMAC), i.e. homo- and copolymerise of dialkyldimethylammonium chloride which contain pyrrolidinium groups of the structure

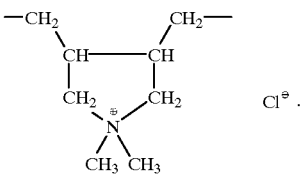

Such compounds are described, for example, in U.S. Pat. No. 4,742,134 (molecular weights usually 100,000–600,000).

The compounds B furthermore include polyethylenimines i.e. linear and branched products obtainable by acid-catalyzed ring-opening polyaddition of ethylenimine and which can optionally be crosslinked with 1,2-substituted electrophilic ethane derivatives, such as 1,2-dichloroethane. High molecular weight polyethylenimines in the form of alkaline solutions having a solids content of 30 to 50% by weight are commercially obtainable. This class of compound is described in "Methoden der Organischen Chemie" [Methods of organic chemistry] (Houben-Weyl), Volume E 20/2, Georg Thieme Verlag, Stuttgart, page 1483 et seq. and in Ullmann's Encyclopedia of Industrial Chemistry, Fifth Edition, Volume A3, page 240 (molecular weights 450–100,000).

Preferred compounds B also include homo- and copolymers of dimethylaminopropylacrylamide or -methacrylamide. Such polymers, which are preferably obtainable from 50 to 100% by weight of quaternized dimethylaminopropyl(meth)acrylamide and 0 to 50% by weight of acrylamide, acrylic acid, methacrylic acid or mixtures thereof and have limiting viscosities below 150 ml/g, measured in 10% strength by weight aqueous sodium chloride solution at 25° C. Such polymers are described, for example, in German Offenlegungsschrift 3 905 049.

Preferred compounds B furthermore include polycondensates which are obtainable from polyaniines, such as, for example, diethylenetriamine, triethylenetetramine, tetraethylenepentamine, pentaethylenehexamine and cyanamide or derivatives thereof (such as, for example, guanidine) or polymers thereof (such as, for example, dicyandiamide and biguanidine) in a molar ratio of 2:1 to 1:2, if appropriate in the presence of ammonium salts, ammonia being split off, such as are described, for example, in German Offenlegungsschrift 3 940 481. Such compounds usually have molecular weights of 1,000–$10^5$.

Preferred compounds B are also polycondensates which are obtainable from polyamidoamines and alkylene dihalides, preferably 1,2-dichloroethane, and have a molecular weight, determined as the number-average, of at least 5,000 and a viscosity, measured at 25° C. on a 20 to 60% strength by weight aqueous solution, of 50 to 4,000 mPa.s. Starting substances for these are preferably polyamidoamines having a molecular weight, determined as the number average, of 2,000 to 20,000, which can be obtained from polyamines, such as are obtained by reaction of 1,2-dichloroethane with aqueous ammonia and subsequent removal of ethylenediamine, diethylenetriamine and triethylenetetramine, and aliphatic dicarboxylic acids, such as succinic, glutaric, adipic or sebacic acid, in a molar ratio of 0.75 to 1.3. The ratio of alkylene dihalide/polyamidoamine here is preferably 0.01 to 0.1 mol of alkylene dihalide per mole of basic nitrogen of the polyamidoamine; cf. German Offenlegungsschrift 2 756 431 and 3 721 057. The molecular weights can be up to $10^7$.

Preferred compounds B are also polycondensates which are obtainable from polyamines and/or polyamidoamines and epichlorohydrin and have a viscosity of 10 to 150 mPa.s, measured at 25° C. on a 15% strength by weight aqueous solution, such as are known, for example, from German Offenlegungsschrift 1 906 450, 2 756 431 and 4 136 289. In this reaction, preferably 0.3 to 0.8 mol of epichlorohydrin is reacted per mole of total basic nitrogen present in the polyamines or polyamidoamines.

Preferred such polycondensates are self-crosslinking, water-soluble reaction products of epihalogenohydrins or α-dihalogenohydrins which have been prepared from epihalogenohydrins and/or α-dihalogenohydrins, water-soluble, basic polyamides and water-soluble polyamines which contain at least 2 nitrogen atoms separated from one another by at least 3 carbon atoms and if appropriate also by oxygen or sulphur atoms and at least 2 hydrogen atoms bonded to different nitrogen atoms.

Examples which may be mentioned of water-soluble polyamines on which the self-crosslinking, water-soluble reaction products are based are:

water-soluble, aliphatic polyamines, such as 1,3-bis-(2-aminoethylamino)-propane, 3-(3-diethylamino-propylamino)-propylamine, bis-(2-amino-ethyl)-ether, 2,2'-bis-methylamino-diethyl ether, 2,2'-bis-(2-amino-ethylamino)-diethyl ether, bis-(3-amino-propyl) ether, bis-(3-amino-propyl) sulphide, 1,6-bis-(2-amino-ethylamino)-hexane, 1,6-bis-(3-amino-propylamino)-hexane, bis-(6-amino-n-hexyl)-amine and 1,3-diamino-butane, and in particular polyalkylenepolyamines of the formula

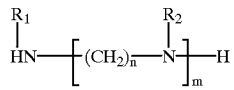

in which

R₁ and R₂ independently of one another denote hydrogen or a $C_1$–$C_4$-alkyl radical which is optionally substituted by an amino or hydroxyl group, m denotes a number from 1 to 8, preferably 2 to 4, and n denotes a number from 3 to 10, preferably 3 to 6, for example 1,3-diamino-propane, 1-amino-3-methylamino-propane, 1,3-bis-( 2-hydroxy-ethylamino)-propane, 1,4-diamino-butane, 1,4-bis-methylamino-butane, N-(3-amino-propyl)-tetramethylenediamine, N,N'-bis-(3-amino-propyl)-tetramethylenediamine and, above all, bis-(3-amino-propyl)-amine and hexamethylenediamine, and furthermore polyamines of the formula

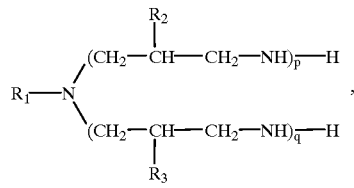

in which

R₁ denotes a $C_1$–$C_{18}$-alkyl radical which is optionally substituted by an amino or hydroxyl group, R₂ and R₃ independently of one another denote hydrogen or a methyl group and the sum of p+q denotes a number from 1 to 20, preferably 2 to 5, for example ethyl-bis-(3-amino-propyl)-amine, 2-hydroxyethyl-bis-(3-amino-propyl)-amine, n-butyl-bis-(3-amino-propyl)-amine, tris-(3-amino-propyl)-amine and, above all, methyl-bis-(3-amino-propyl)-amine.

Water-soluble, cycloaliphatic and araliphatic polyamines, such as 1,4-diamino-cyclohexane, 1-amino-methyl-5-amino-1,3,3-trimethyl-cyclohexane, 1,3-bis-aminomethylbenzene and benzyl-bis-(3-amino-propyl)-amine, are furthermore also possible.

Possible water-soluble, basic polyamides on which the self-crosslinking, water-soluble reaction products are based are, in particular:

reaction products of saturated aliphatic $C_4$–$C_{10}$-dicarboxylic acids, such as succinic acid, glutaric acid, adipic acid, diglycolic acid or sebacic acid, or functional derivatives thereof, such as anhydrides and esters, with aliphatic polyamines which contain at least 2 primary amino groups and at least one secondary or tertiary amino group; such amines are, for example, methyl-bis-(3-amino-propyl)-amine, ethyl-bis-(3-amino-propyl)-amine, 2-hydroxyethyl-bis-(3-amino-propyl)-amine, N-(3-amino-propyl)-tetramethylenediamine and N,N'-bis-(3-amino-propyl)-tetramethylenediamine, but in particular polyalkylenepolyamines of the formula

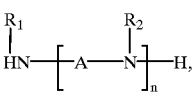

in which

A denotes a $C_2$–$C_8$-alkylene radical,

R₂ and R₃ independently of one another denote hydrogen or a $C_2$–$C_{10}$-alkyl radical which is optionally substituted by a hydroxyl or amino group and n denotes a number from 2 to 5, such as di-1,2-propylene-triamine, bis-(3-amino-propyl)-amine, tri-1,2-propylene-tetramine and, above all, diethylenetriamine, triethylenetetramine and tetraethylenepentamine.

Examples of particularly preferred starting polyamines are: diethylenetriamine, triethylenetetramine, tetraethylenepentamine, pentaethylenehexamine, hexaethyleneheptamine, dipropylenetriamine, dihexamethylenetriamine, N-methyl-bis-(3-aminopropyl)-amine, tris-(2-aminoethyl)amine, piperazine, bis(piperazinyl)ethane, N-(2-amino-ethyl)-piperazine, bisaminoethylpiperazine and bisaminopropylpiperazine.

Suitable polyamido amine starting components are polyamidoamines from a) aliphatic and/or aromatic dicarboxylic acids and b) polyamines which contain at least two amino groups capable of amide formation and at least one other secondary or tertiary amino group and, if appropriate, c) polyamines which contain two amino groups capable of amide formation but no other secondary and tertiary amino groups and, if appropriate, d) ω-aminocarboxylic acids and/or lactams, preferably 0.8 to 1.2 mol of component b) and if appropriate up to 0.8 mol of component c) and if appropriate up to 1.5 mol of component d), in each case per mole of component a), being employed, with the proviso that the molar ratio of (b+c):a assumes values between 0.8:1 and 1.2:1.

Preferred dicarboxylic acids a) include oxalic acid, malonic acid, succinic acid, glutaric acid, adipic acid, sebacic acid, isophthalic acid, terephthalic acid, maleic acid and itaconic acid.

Preferred polyamines b) and c) include diethylenetriamine, triethylenetetramine, tetraethylenepentamine, pentaethylenehexamine, hexaethyleneheptamine, dipropyltriamine, dihexamethylenetriamine, N-methyl-bis-(3-aminopropyl) amine, tris-(2-aminoethyl)amine, N-(2-aminoethyl) piperazine, bisaminoethylpiperazine, bisaminopropylpiperazine, ethylenediamine, diaminopropane, 1,6-diaminohexane, N-(2-hydroxyethyl) ethylenediamine, N,N'-dimethylethylenediamine, N-methyl-1,3-diaminopropane, isophoronediamine, 4,4'-diamino-dicyclohexylmethane and piperazine.

The ω-aminocarboxylic acids and lactams d) include aminocaproic acid, 11-aminoundecanoic acid, caprolactam and lauryllactam.

As soon as the desired viscosity is reached, complete premature crosslinking can be prevented by addition of acid. The molecular weights of such products can be $10^3$ to $10^6$.

Other preferred compounds B are crosslinked polyalkylenepolyamines having a viscosity of at least 100 mPa.s, measured at 20° C. on a 20% strength by weight aqueous solution, such as can be obtained, for example, by partial amidation of polyalkylenepolyamines with carboxylic acids, carboxylic acid esters, carboxylic acid anhydrides or carboxylic acid halides and subsequent crosslinking with 0.001 to 10 parts by weight of an at least bifunctional crosslinking agent per part by weight of partly amidated polyalkylenepolyamine. Such products are described, for example, in DE-OS 4 240 110.

Preferred compounds B are furthermore melamine/formaldehyde condensates, such as are described, for example, in "Methoden der Organischen Chemie" [Methods of organic chemistry] (Houben-Weyl), Volume XIV/2, Georg Thieme Verlag, Stuttgart 1963, page 357 et seq. Preferred melamine/formaldehyde condensates are, for example, condensates which are obtainable by acid-catalysed reaction of 1 to 7 mol of formaldehyde per mole of melamine and contain N-methylol ether groups and/or methylene bridges between two nitrogen atoms.

Preferred compounds B are also (potentially) cationic polyacrylamides, such as can be obtained either by copolymerization of acrylamide and cationic vinylmonomers, such as, for example, dialkylaminoethyl acrylate or methacrylate, preferably dimethylaminoethyl acrylate or methacrylate, or acryloylethyltrimethylammonium chloride or methacrylamidopropyl-trimethylammonium chloride, or by cationic modification of nonionic polyacrylamides, for example by reaction with dimethylamine and formaldehyde (A. Einhorn in Liebigs Ann. 343 (1905), 207); cf. the literature corresponding to the above footnote 2, pages 45 to 48. The molecular weights of these substances can be up to $10^7$.

Preferred compounds B are also vinylamine homo- and copolymers, such as are described, for example, in German Offenlegungsschrift 4 241 117 and in EP-A 580 078 and 580 079. These are partly or completely, hydrolysed polyvinylcarboxylic acid amides, preferably formamides. Preferred such copolymers are obtainable, for example, by copolymerization of a) 5 to 99 mol % of N-vinylcarboxylic acid amides of the formula

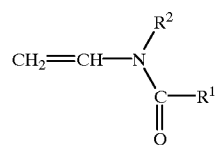

in which $R^1$ and $R^2$ denote H or $C_1$–$C_6$-alkyl, b) 95 to 1 mol % of monoethylenically unsaturated carboxylic acids having 3 to 8 C atoms and/or alkali metal, alkaline earth metal or ammonium salts thereof, and if appropriate c) up to 30 mol % of other monoethylenically unsaturated compounds which are copolymerizable with monomers a) and b), and if appropriate d) up to 2 mol % of compounds which contain at least two ethylenically unsaturated non-conjugated double bonds in the molecule, and subsequent partial or complete splitting off of the formyl groups from the monomers copolymerized into the copolymer, to form amine or ammonium groups.

Examples of other vinylamine copolymers are partly or completely hydrolysed copolymers of vinylcarboxylic acid amides with acrylonitrile, it being possible for the acrylonitrile content to be up to 80 mol %, based on the monomers to be polymerized. Such copolymers are described, for example, in German Offenlegungsschrift 4 328 975.

Preferred compounds B also include polyvinyl alcohols having an amine functionality, such as are described, for example, in German Offenlegungsschrift 4 323 560. These are preferably partly or completely hydrolysed copolymers of vinyl acetate and 1 to 25 mol %, based on the monomers to be polymerized, of N-vinylcarboxylic acid amide, preferably N-vinylformamide.

The cellulose-containing materials which are suitable for the process according to the invention are, for example, paper or paper-like materials, such as paperboard or cardboard.

Various process variants are possible for the use of the anionic polyisocyanates A and the cationic compounds B:

For use in the pulp, the starting fibre raw material suspension, which optionally contains filler, can first be treated with the cationic or potentially cationic compound B, for example by addition in the form of an aqueous solution or dispersion. The anionic polyisocyanate A can then be added directly in the form of an aqueous solution or dispersion. In a preferred embodiment, the cationic or potentially cationic compound B is added in the first process step in an amount such that the negative charges of the cellulose in the starting fibre raw material are completely or only partly compensated. The charge state of the starting fibre raw material can be checked, for example, by zeta potential measurements. Another possibility for testing the charge circumstances comprises titration of excess cationic and anionic charges in the aqueous phase of the fibre raw material suspension. In a less preferred embodiment, the two process steps can be carried out simultaneously, for example by premixing the components before the addition.

For carrying out the process described industrially, the starting fibre raw material suspensions pretreated by the two process steps is processed into paper, paperboard or cardboard in a manner known per se by successive dewatering on a papermaking machine.

In addition to the use in the pulp comprising the two process steps just described, there is the possibility of carrying out the first process step in the pulp and after-treating the base paper thus obtained on its surface with the anionically or potentially anionic polyisocyanate A on a size press in the second process step.

According to a particular embodiment, commercially available retention agents, dewatering auxiliaries or wet-strength agents can be employed as cationic compounds if they meet the requirements according to the claims. The advantage lies not solely in the favourable price, but also, for example, in the fact that in the case of papers which are to be given a very high wet-strength treatment and have a high filler content, such as, for example, decorating paper, the amount of conventional wet-strength agent employed can be reduced and effects caused by the use of large amounts of conventional wet-strength agents, such as, for example, aggregation of the filler particles, are eliminated.

By combination of, for example, the highly cationic polyamine or polyamidoamine/epichlorohydrin condensates B with the anionic polyisocyanates A, very good control of the charge states in the aqueous fibre raw material suspension is possible, allowing optimum adjustment of filler retention and opacity in the production of decorating paper.

The process according to the invention is thus suitable not only for the production of papers which have been given a particularly high wet-strength treatment, such as, for example, decorating paper or label paper, but also for papers with particular surface properties, such as security paper or banknote paper.

As in the variant just described, in which the cationic compound B is employed in the pulp, while the anionic polyisocyanate A is applied to the surface, the polyisocyanate A can also be employed for coating paper. In this case, the polyisocyanate A is applied to the base paper together with the coating colour; the paper coating is improved in this way in respect of waterproofness and wet pick resistance.

The customary additives, such as starch, optical brighteners and sizing agents, can of course be co-used.

It is particularly preferable to meter the aqueous dispersion of the polyisocyanates A into the fibre substance in the course of 60 minutes, preferably in the course of 15 minutes. Continuous production and metering of the aqueous dispersion into the pulp stream of the papermaking machine is especially advantageous. Addition to the thick pulp is preferred here, in order to obtain an optimum activity because of the high pulp consistency and longer residence times.

The process according to the invention gives ready-to-use papers of good wet strength immediately on the machine.

The wet-strength and dry-strength action can be intensified by storing the finished paper at room temperature and/or after-condensation at elevated temperature. However, a higher level of wet strength is generally already achieved from the machine than with conventional wet-strength agents. The dry strength is also improved compared with products using conventional wet-strength agents.

The process according to the invention can be carried out under the processing temperatures customary in the paper industry, preferably at 30 to 70° C.

The strength level of the paper can be adjusted in the desired manner by suitable choice of the starting components. The process according to the invention is suitable not only for the production of papers which have dry strength and are waterproof, but also for the production of papers which are resistant to oil and petrol. The improved intrinsic retention and a detectable sizing action are also important. Partial hydrophobicity and sizing give an improved capacity for being written and printed on.

In the following examples, the percentage data are percentages by weight, unless stated otherwise; parts are parts by weight.

EXAMPLES

1.) Water-dispersible isocyanates 1.1 Water-dispersible isocyanate 1 (according to the invention)

81.3 g of a polyisocyanate which has been prepared by trimerization of some of the isocyanate groups of 1,6-diisocyanatohexane, contains isocyanate groups, essentially comprises tri-(6-isocyanato-hexyl) isocyanurate and higher homologues thereof and has an NCO content of 20.5%, a content of monomeric 1,6-diisocyanatohexane of less than 0.3% and a viscosity of 1000 mPa.s (25° C.) are stirred overnight at 60° C. with 16.7 g of a polyether which is based on ethyleneoxide which has been started from 2-(2-methoxyethoxy)-ethanol and has a number-average molecular weight of 350 g/mol and a hydroxyl number of 160 mg of KOH/g, with the addition of 2 g of sodium hydroxyethylsulphonate, dissolved in 300 ml of dimethylacetamide. For working up the reaction weight, the solvent is distilled off under a water pump vacuum at 70° C./10 mbar; thereafter, the reaction product still contains 10% of solvent. The isocyanate content is 11.1% and the viscosity at 25° C. is 400 mPa.s.

1.2 Water-dispersible isocyanate 2 (according to the invention)

82.6 g of a polyisocyanate according to Example 1.1 are allowed to react with 16.9 g of a polyether according to Example 1.1 at 60° C., with the addition of 0.5 g of lactic acid. A clear, oily substance having an isocyanate content of 15.4% and a viscosity of 2250 mPa.s at 25° C. is formed.

1.3 Water-dispersible isocyanate 3 (according to the invention)

82.2 g of a polyisocyanate according to Example 1.1 are allowed to react with 16.0 g of a polyether according to Example 1.1 at 60° C., with the addition of 1.0 g of lactic acid. A clear, oily substance having an isocyanate content of 14.3% and a viscosity of 2250 mPa.s at 25° C. is formed.

1.4 Water-dispersible isocyanate 4 (Comparison example corresponding to EP-A 582 166

82.2 g of a polyisocyanate which has been prepared by trimerization of some of the isocyanate groups of 1,6-diisocyanatohexane, contains isocyanate groups, essentially comprises tri-(6-isocyanate-hexyl) isocyanurate and higher homologues- thereof and has an NCO content of 21.6%, a content of monomeric 1,6-diisocyanatohexane of less than 0.3% and a viscosity of 3000 mPa.s (25° C.) are stirred for 7 hours at 60° C. with 16.7 g of a polyether based on ethylene oxide which has been started from 2-(2-methoxyethoxy)-ethanol and has a number-average molecular weight of 350 g/mol and a hydroxyl number of 160 mg of KOH/g, with the addition of 1 g of diethylaminoethanol. A clear, oily substance having an isocyanate content of 14.4% and a viscosity of 2708 mPa.s at 25° C. is formed. To prepare a ready-to-use water-dispersible isocyanate, 80% by weight of the substance prepared is diluted with 20% of propylene glycol diacetate.

All the reaction products are water-clear liquids of oily appearance which can easily be dispersed in water (in a glass beaker by stirring by means of a spatula).

2. Cationic polymers 1

2.1 Cationic polymer 1

A polymer of the polyvinylamine type which contains primary amino groups and is marketed under the tradename BASOCOLL PR 8546 by BASF AG. Use form: an aqueous solution comprising 11% of solids.

2.2 Cationic polymer 2

A polycondensation product of dicyandiamide and diethylenetriamine, as described in German Offenlegungsschrift 3 940 481, Example 1. Use form: an aqueous solution comprising 45% of active substance.

Preparation:

277.2 parts of dicyandiamide are suspended in 240 parts of diethylene glycol and the suspension is mixed with 309 parts of diethylenetriamine, during which the temperature rises to about 40 to 45° C. 24 parts of ammonium chloride are added and the mixture is heated to 110° C. in the course of 20 minutes, evolution of ammonia starting from 50° C. The ammonia which escapes is collected in a deep-freeze trap. The reaction mixture is heated to 150° C. in the course of 2 hours by continuously increasing the temperature and is stirred at 150° C. for 60 minutes. The evolution of ammonia has then stopped almost completely and a clear, highly viscous melt has formed. The reaction mixture is allowed to cool to about 140° C. and 600 parts of water are allowed to run in rapidly, whereupon a clear solution forms, which is cooled to 40 to 50° C. The solution is brought to a pH of 6.5 to 7.0 with 275 parts of 36.5% strength hydrochloric acid, while cooling. 1555 g of a clear, pale yellow solution having a solids content of 49.5% (drying in vacuo at 100° C. for 3 hours) are obtained. 119.5 g of ammonia were collected in the deep-freeze trap.

2.3 Cationic polymer 3

A cationic starch marketed under the tradename Emcat C3 by Emsland-Stärke GmbH. Use form: as a solid.

2.4 Cationic polymer 4 a) 2.45 kg of diethylenetriamine are subjected to a condensation reaction with 3.39 kg of adipic acid in the melt. 0.84 kg of water of reaction is split off by this reaction. After the reaction, the entire melt is dissolved in 5.00 kg of water.

b) 1.09 kg of the precondensate prepared according to instructions a) (aqueous solution) are mixed with 3.58 kg of water at room temperature. 0.18 kg of epichlorohydrin is metered in at the same temperature in the course of 30 minutes and the reaction mixture is stirred for 3 hours. Thereafter, it is heated to 55° C. and a further 0.01 kg of the precondensate prepared according to instructions a) is metered in. When a viscosity of 100 mPas is reached, the reaction is stopped by addition of 0.09 kg of sulphuric acid (48% strength) and the aqueous solution is brought to a pH of 2.8 with formic acid.

The use form used here is an aqueous solution comprising 15% of solids.

2.5 Cationic polymer 5 a) 3.76 kg of a polyamine mixture (polyethylenepolyamine mixture) having a base equivalent weight of 50 g/equivalent of base nitrogen and a viscosity of 250 mPas at 20° C. are subjected to a condensation reaction with 1.65 kg of adipic acid in the melt. 0.41 kg of water of reaction is split off by this reaction. After the reaction, the melt is dissolved in 5.00 kg of water.

b) 4.68 kg of the precondensate prepared according to instructions a) (aqueous solution) are mixed with 5.18 kg of water at room temperature; 0.19 kg of dichloroethane is then metered into the closed reactor at 125° C., while stirring. After the reaction (reaction time 1 to 2.5 hours), the reactor is let down, after cooling, and the product is degassed. It is then filtered over a 100 μm Perlon filter.

The use form used here is an aqueous solution comprising 28 to 29% of solids.

2.6 Cationic polymer 6 a) 2.54 kg of diethylenetriamine are subjected to a condensation reaction with 3.27 kg of adipic acid in the melt. 0.81 kg of water of reaction is split off by this reaction. After the reaction, the entire melt is dissolved in 5.00 kg of water.

b) 3.56 kg of the precondensate described under a) (aqueous solution), mixed together with 0.31 kg of diethylenetriamine and 5.72 kg of water, are initially introduced into the closed reactor at 125° C. As described in section 2.5, 0.41 kg of dichloroethane is then metered in, while stirring. The reaction time is about 3 hours. After cooling, the reaction mixture is let down and degassed.

The use form used here is an aqueous solution comprising 25% of solids.

Use Examples 1 to 7 (according to the invention) and 8 to 15 (comparison)

Cellulose (pine/birch sulphate in a weight ratio of 80:20) is beaten to a degree of freeness of 38° SR in a beater at a pulp consistency of 2.5%. 100 g portions of the resulting cellulose suspension are then diluted to a volume of 1000 ml with water in glass beakers.

The amounts of cationic polymers shown in the following Table 1 (% by weight of the use form, based on the cellulose) are added, while stirring by means of a magnetic stirrer, and the mixture is stirred for 10 minutes. The isocyanate (% by weight of active substance, based on the cellulose) is then added in the form of a 1% strength aqueous dispersion. The cellulose dispersions are then stirred of 3 minutes.

Thereafter, sheets of paper having a weight per unit area of about 80 g/m$^2$ (in accordance with DIN 54358, part 1) are formed with the contents of the glass beakers on a sheet-forming machine (Rapid-Kothen apparatus). The sheets of paper are dried in vacuo under 50 mm Hg at 85° C. for 8 minutes and after-heated at 110° C. in a drying cabinet for a further 10 minutes.

After conditioning, 5 test strips 1.5 cm wide are cut out of each sheet of paper and immersed in distilled water for 5 minutes. The wet strips are then tested immediately for their wet breaking load on a tensile tester (DIN 53112, part 2). The immerzing properties of the paper produced are furthermore tested by the drop test. For this, a drop of water is applied to the sheet of paper and the time which passes before the drop is absorbed is determined with a stopwatch.

TABLE 1

Sizing action, measured by the drop test

| Experiment No. | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Cationic polymer No. 3, Amount employed in % of active substance | 0.15 | 0.15 | 0.15 | 0.3 | 0.3 | 0.3 | 0.3 | 0.15 | 0.15 | 0.15 | 0.15 | 0.3 | 0.3 | 0.3 | 0.3 |
| water-dispersible isocyanate No. 1; amount employed in % of active substance | 0.3 | 0.6 | 1 | 0.1 | 0.3 | 0.6 | 1 | | | | | | | | |
| water-dispersible isocyanate No. 4, amount employed in % of active substance | | | | | | | | 0.1 | 0.3 | 0.6 | 1 | 0.1 | 0.3 | 0.6 | |
| Wet breaking load [N] | 18.3 | 19.2 | 20.5 | 15.6 | 17.6 | 21.2 | 21.5 | 8.9 | 10.2 | 12.6 | 15.3 | 11.5 | 13.2 | 13.6 | 15.7 |
| Drop test [min] | 14:40 | >20 | >20 | 09:30 | 20 | >20 | >20 | 07:20 | 09:15 | 09:15 | 12 | 06:30 | 09:20 | 11 | 11:30 |
| Weight per unit area [g/m$^2$] | 83.4 | 80.6 | 82.8 | 82.8 | 81.5 | 82.5 | 82.2 | 81.8 | 82.5 | 80.9 | 81.5 | 82.8 | 82.8 | 82.5 | 82.8 |
| | according to the invention | | | | | | | comparison experiments | | | | | | | |

TABLE 2

Embodiment examples 16 to 25 (according to the invention) and 26 to 30 (comparison)
Sample sheets are produced and tested as described in embodiment examples 1 to 15. Additions to the fibre substance suspension and the measurement values are summarized in Table 2.

| Experiment No. | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|
| Cationic polymer No. 1, % by weight of the use form | 0.5 | 0.5 | 0.5 | 0.5 | 0.5 | | | | | | | | | | |
| Cationic polymer No. 2, % by weight of the use form | | | | | | 0.5 | 0.5 | 0.5 | 0.5 | 0.5 | | | | | |
| Cationic polymer No. 3, % by weight of the use form | | | | | | | | | | | 1.5 | 1.5 | 1.5 | 1.5 | 1.5 |
| Water-dispersible isocyanate 1, % of active substance | 0.1 | 0.3 | 0.5 | 0.8 | 1 | 0.1 | 0.3 | 0.5 | 0.8 | 1 | | | | | |
| Water-dispersible isocyanate 4, % of active substance | | | | | | | | | | | 0.1 | 0.3 | 0.5 | 0.8 | 1.0 |
| Wet breaking load [N] | 10.8 | 15.7 | 17.6 | 19.4 | 19.1 | 10.8 | 16.4 | 18.4 | 19.7 | 21.2 | 2.4 | 3.1 | 3.8 | 4.7 | 4.4 |
| Hydrophobization | | | | | yes | | | | yes | yes | | | | | |
| | | | | | according to the invention | | | | | | | | comparison | | |

TABLE 3

Embodiment Examples 31 to 46 (according to the invention)
Sample sheets are produced and tested as described in embodiment examples 1 to 15. Additions to the fibre substance suspension and the measurement values are summarized in Table 3.

| Experiment No. | 31 | 32 | 33 | 34 | 35 | 36 | 37 | 38 | 39 | 40 | 41 | 42 | 43 | 44 | 45 | 46 |
|---|---|---|---|---|---|---|---|---|---|---|---|---|---|---|---|---|
| Cationic polymer No. 5, % by weight of the use form | 0.5 | 0.5 | 0.5 | | | | | | | | | | | | | |
| Cationic polymer No. 6, % by weight of the use form | | | | 0.5 | 0.5 | 0.5 | | | | | | | | | | |
| Cationic polymer No. 2, % by weight of the use form | | | | | | | 0.5 | 0.5 | 0.5 | | | | | | | |
| Cationic polymer No. 4, % by weight of the use form | | | | | | | | | | 0.075 | 0.075 | 0.075 | | | | 0.15 |
| Cationic polymer No. 3, % by weight of the use form | | | | | | | | | | | | | 1.5 | 1.5 | 1.5 | |
| Water-dispersible isocyanate 1, % of active substance | 0.1 | 0.3 | 0.6 | 0.1 | 0.3 | 0.6 | 0.1 | 0.3 | 0.6 | 0.1 | 0.3 | 0.6 | 0.1 | 0.3 | 0.6 | 0.1 |
| Wet breaking load [N] | 8.9 | 14.8 | 19 | 9.4 | 14.8 | 18.2 | 11.5 | 15.5 | 20.2 | 9.7 | 15 | 18.2 | 9.3 | 14.7 | 20.4 | 13.6 |
| Drop test [minutes] | 06:50 | 11 | >20 | 05:50 | 07:30 | >20 | 10 | >20 | >20 | 07:15 | 12:10 | >20 | 04:10 | >20 | >20 | 09:30 |
| | | | | | | | according to the invention | | | | | | | | | |

Table 4

Examples 47 to 60: Experiments on the production of decorating paper

A cellulose mixture of eucalyptus-ECF/pine sulphate (in a ratio of 80:20) is beaten to a degree of freeness of 28 to 30° SR in a beater and 80% by weight of TiO$_2$ (BAYERTITAN R-PL-1) (based on the cellulose) is added. The aqueous suspension is prepared as in Examples 1 to 19, but is brought to a pH of 6 to 6.8 with sulphuric acid. Sheets are then produced on a sheet-forming unit of the Rapid-Köthen design. The data in % by weight relates to the use form of the products and to the cellulose employed. Wet breaking loads are determined as described above, the CIE whiteness is determined in accordance with ISO TC 38 textile and the ash content is determined by incinerating the paper.

| | 47 | 48 | 49 | 50 | 51 | 52 | 53 | 54 | 55 |
|---|---|---|---|---|---|---|---|---|---|
| Cationic polymer 2, % by weight of the use form | | | | | | | | | |
| Cationic polymer 4, % by weight of the use form | 6.00 | 4.00 | 2.00 | 5.00 | 4.00 | 3.00 | 2.00 | 1.00 | |
| Water-dispersible polymer 4, by weight of the use form | | | | 0.19 | 0.38 | 0.56 | 0.75 | 0.94 | 1.13 |
| Water-dispersible polymer 1, % by weight of the use form | | | | | | | | | |
| Weight per unit area (g/m$^2$) | 126.80 | 118.40 | 115.90 | 118.30 | 114.20 | 113.20 | 109.10 | 105.80 | 105.40 |

-continued

|  | 47 | 48 | 49 | 50 | 51 | 52 | 53 | 54 | 55 |
|---|---|---|---|---|---|---|---|---|---|
| Wet breaking load (N) | 7.40 | 4.90 | 3.20 | 9.10 | 7.50 | 8.00 | 8.60 | 7.20 | 7.20 |
| Ash content (% by weight) | 34.70 | 30.20 | 26.80 | 29.80 | 27.70 | 26.10 | 22.70 | 20.70 | 20.70 |
| CIE whiteness | 77.50 | 78.30 | 79.30 | 78.40 | 78.60 | 78.70 | 79.30 | 81.50 | 81.50 |
| Opacity | 98.90 | 98.70 | 98.40 | 98.20 | 98.40 | 98.20 | 97.90 | 97.30 | 97.30 |
|  | Comparison | | | | according to the invention | | | comparison | |

TABLE 4

|  | 56 | 57 | 58 | 59 | 60 |
|---|---|---|---|---|---|
| Cationic polymer 2, % by weight of the use form |  |  |  |  |  |
| Cationic polymer 4, % by weight of the use form | 5.00 | 4.00 | 3.00 | 2.00 | 1.00 |
| Water-dispersible polymer 4, % by weight of the use form |  |  |  |  |  |
| Water-dispersible polymer 1, % by weight of the use form | 0.17 | 0.33 | 0.50 | 0.67 | 0.83 |
| Weight per unit area (g/m$^2$) | 122.60 | 113.00 | 111.40 | 112.50 | 104.50 |
| Wet breaking load (N) | 9.50 | 9.0 | 9.80 | 11.30 | 7.90 |
| Ash content (% by weight) | 31.30 | 27.00 | 26.30 | 28.40 | 20.60 |
| CIE whiteness | 78.50 | 78.50 | 77.30 | 76.00 | 79.30 |
| Opacity | 98.40 | 98.60 | 98.00 | 98.00 | 95.80 |
|  | according to the invention | | | | |

We claim:

1. A process for finishing paper with
   (A) a polyisocyanate having an NCO content of 1 to 21.5% by weight and 50 to 5,000 milliequivalents of anionic and/or potentially anionic groups per 100 g of polyisocyanate A, and
   (B) a compound having 5 to 5,000 milliequivalents of cationic and/or potentially cationic groups per 100 g of compound B, comprising
   (1) metering polyisocyanate (A) and compound (B), either simultaneously or sequentially, into an aqueous cellulose-containing pulp and converting the pulp to a finished paper, or
   (2) metering compound (B) into an aqueous cellulose-containing pulp, converting the pulp to a cellulose-containing base paper, and metering polyisocyanate (A) onto the surface of the base paper to form a finished paper,
   in amount such that 0.001 to 25 parts by weight of polyisocyanate (A) and 0.001 to 25 parts by weight of compound (B) are used per 100 parts by dry weight of the solid content of the pulp.

2. A process according to claim 1 wherein polyisocyanate (A) has an NCO content of 4 to 20% by weight.

3. A process according to claim 1 wherein polyisocyanate (A) contains 50 to 3,500 milliequivalents of anionic and/or potentially anionic groups per 100 g of polyisocyanate (A).

4. A process according to claim 1 wherein compound (B) contains 50 to 3,500 milliequivalents of cationic and/or potentially cationic groups per 100 g of compound (B).

5. A process according to claim 1 wherein 0.1 to 10 parts by weight of polyisocyanate (A) and 0.01 to 10 parts by weight of compound (B) are used per 100 parts by dry weight of the solid content of the pulp.

6. A process according to claim 1 wherein compound (B) is first added to the pulp and polyisocyanate (A) is then added to the pulp.

* * * * *